United States Patent [19]

Bray

[11] Patent Number: 4,711,723
[45] Date of Patent: Dec. 8, 1987

[54] WATER PURIFICATION SYSTEM

[75] Inventor: Donald T. Bray, Escondido, Calif.

[73] Assignee: Nimbus Water Systems, Inc., Escondido, Calif.

[21] Appl. No.: 867,480

[22] Filed: May 27, 1986

[51] Int. Cl.$^4$ ............................................. C02F 9/00
[52] U.S. Cl. ................................. 210/652; 210/669; 210/694; 210/261; 210/266
[58] Field of Search .............. 210/637, 638, 650–655, 210/669, 694, 256, 260, 261, 262, 266, 321.1, 321.2, 321.3, 321.4, 321.5, 900

[56] References Cited

U.S. PATENT DOCUMENTS

| 4,160,727 | 7/1979 | Harris | 210/900 |
| 4,289,617 | 9/1981 | Davis | 210/256 |
| 4,548,716 | 10/1985 | Boeve | 210/900 |

Primary Examiner—Ivars Cintins
Attorney, Agent, or Firm—Fitch, Even, Tabin & Flannery

[57] ABSTRACT

An over-the-counter, free-standing, water purification system including a pressure vessel that encloses a reverse-osmosis separator. Tap water at a pressure of between approximately 20 and 100 psig is introduced into the pressure vessel and a portion of the water is forced through the reverse-osmosis separator, while the remaining water is discharged from the pressure vessel along with the pollutants that are too large to penetrate the membrane of the reverse-osmosis separator. The product water passes through the reverse-osmosis separator at a rate of between approximately 5 to 100 milliliters per minute and is then post-filtered at a slow rate through a large amount of activated carbon, between approximately 10 and 1,000 grams, contained within the housing for the purification system. The product water has a contact time of residence time with the activated carbon of between approximately 15 to 30 minutes, which ensures that any odor, taste, color organic waste or chlorine passing through the reverse-osmosis separator are adsorbed by the activated carbon. After passing through the activated carbon, the purified water is discharged from the pressure vessel into, e.g., a container in which it is stored until needed.

6 Claims, 2 Drawing Figures

WATER PURIFICATION SYSTEM

The present invention relates to a water purification device and, more particularly, to such a device for home point-of-use that sits on, e.g., a countertop.

There has been an increasing concern over the extent of contamination of drinking water, primarily due to industrial pollution of surface waters and aquifers. This concern extends even to municipal water supplies. Consequently, homeowners have taken a variety of measures to ensure a supply of pure drinking water, ranging from buying bottled water to installing water purification systems in their homes. While a variety of different types of home water purification systems are available (e.g., sediment filters, deionization systems, ion exchange/water softening systems, distillation systems, and activated carbon systems), systems utilizing reverse-osmosis filtration in combination with activated carbon have proven superior in removing almost all types of pollutants with the greatest convenience and at reasonable expense. See, e.g., U.S. Pat. No. 3,542,199, which is herein incorporated by reference. A reverse-osmosis water purification device works, in general, by forcing water under pressure through a semipermeable membrane that permits water to pass through, but is impermeable to certain impurities such as nitrates, heavy metals and salts, chemical fertilizers, and bacteria and viruses. After the water passes through the reverse-osmosis membrane, it is post-filtered through activated carbon which adsorbs most remaining odor, taste, color, chlorine and organic waste, the effectiveness of the post-filtration depending upon the quantity and density of the carbon, as well as the residence time that the water is in contact with the carbon.

Home-use or point-of-use reverse-osmosis water purification units are conveniently classified as being either under-the-counter units or over-the-counter units. In under-the-counter units, all of the filtration equipment is secured underneath the counter adjacent the sink from the which the tap water to be purified is drawn. Such systems include a storage tank for the purified water that is produced slowly by the reverse-osmosis separator (at a rate of about 10 to 20 milliliters per minute). Water is delivered rapidly from the storage tank to the point of use at a rate of up to a gallon and a half per minute. Typically, this stream is run through a carbon bed just before final use to remove any taste-causing impurities. The residence time of the water in the carbon is small, a few seconds, as the water flows at a relatively high rate, which results in less-than-complete post-filtration treatment by the carbon. Under-the-counter units are usually professionally installed and, while being unobtrusive due to their placement under the counter, are for the same reason inconvenient to maintain and service.

Over-the-counter units, on the other hand, are placed on the countertop adjacent the tap from which the water that is to be treated is drawn. With the advent of owner-serviceable reverse-osmosis separator units that are also watertight at the water pressures needed for reverse-osmosis separation, over-the-counter systems are becoming an economical alternative to the under-the-counter units. However, to be marketable, over-the-counter units must be both attractive and relatively small so as to not take up an excessive amount of counter space. Consequently, due to space limitations, over-the-counter systems are not designed to store water and have used only small amounts of carbon, typically less than 10 grams, in their post filtration system. As a result, such systems have not been as effective as desired in removing the organic matter that happens to pass through the reverse-osmosis membrane with the water.

Accordingly, it is the principal object of the present invention to provide an improved over-the-counter, point-of-use water purification system which produces water of a higher degree of purity than that produced by prior devices.

This object, as well as others that will become apparent upon reference to the accompanying drawing and following detailed description, is provided by an over-the-counter, free-standing, water purification system that includes a pressure vessel that encloses a reverse-osmosis separator. Tap water at a pressure of between approximately 20 and 100 psig is introduced into the pressure vessel and a portion of the water is forced through the reverse-osmosis separator, while the remaining water is discharged from the pressure vessel, along with the pollutants that are too large to penetrate the membrane of the reverse-osmosis separator. The product water passes through the reverse-osmosis separator at a rate of between approximately 5 to 100 milliliters per minute and is then post-filtered at this slow rate through a large amount of activated carbon, between approximately 10 and 1,000 grams, contained within the housing for the purification system. The product water has a contact time or residence time with the activated carbon of between approximately 15 to 30 minutes, which ensures that any odor, taste, color, organic waste or chlorine passing through the reverse-osmosis separator is adsorbed by the activated carbon. After passing through the activated carbon, the purified water is discharged from the pressure vessel into, e.g., a container in which it is stored until needed.

DETAILED DESCRIPTION OF THE PREFERRED EMBODIMENT

Figure 1:
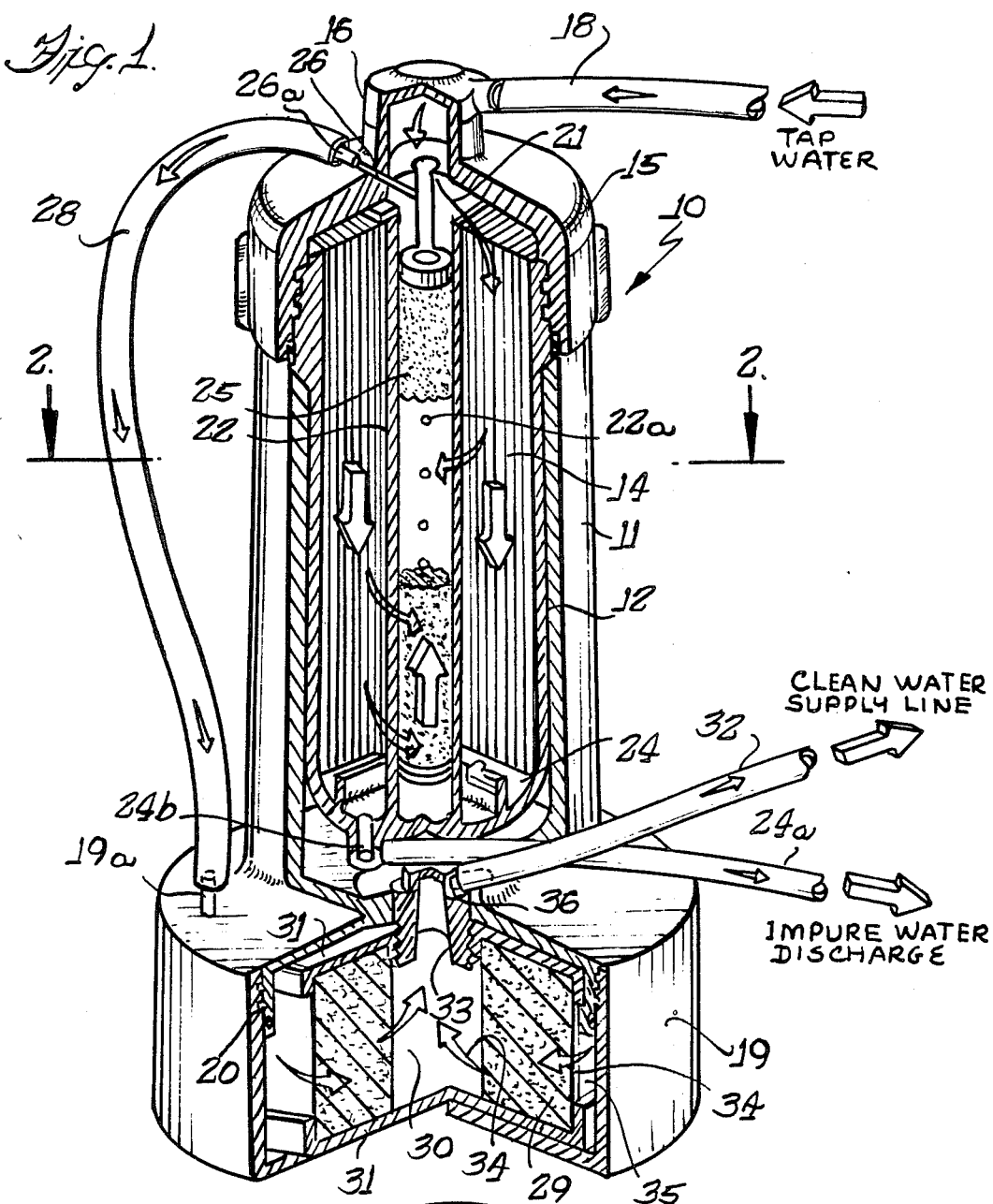
FIG. 1 is a perspective view, broken away to show detail, of a reverse-osmosis water purification system embodying the present invention.
Figure 2:
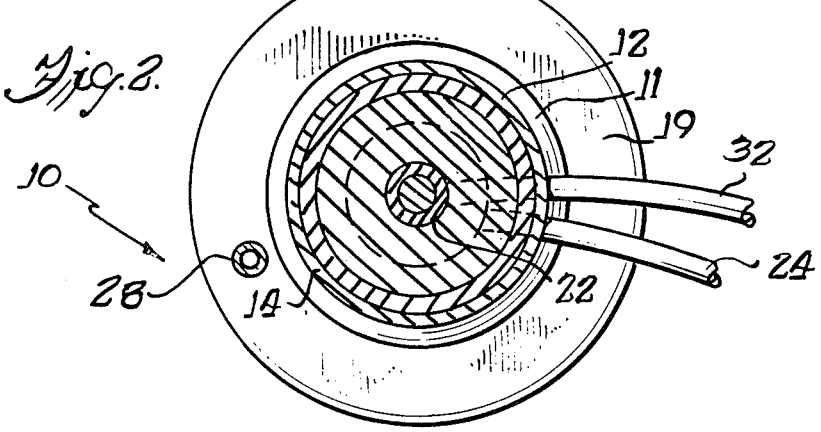
FIG. 2 is a cross-sectional view of the device of FIG. 1 taken substantially along line 2—2 of FIG. 1.

Turning to the figures of the drawing, there is seen a self-contained, free-standing reverse-osmosis water purification system, generally indicated by 10. The device 10 includes a cylindrical central housing portion 11 which supports an integral, molded watertight pressure vessel 12 that encases a reverse-osmosis filter element 14. The pressure vessel 12 includes a cap member 15 threadably received on the vessel 12, the cap 15 supporting an adapter 16 threadably mounted thereon, through which tap water diverted from a faucet (not shown) is introduced into the pressure vessel 12 through tubing 18 at a pressure of between approximately 20 and 100 psig. An enlarged-diameter base 19 is threadably secured to the lower end of the central portion 11 of the unit 10. In practice, the base 19 has a diameter of approximately 13 cm, while the central housing portion 11 has a diameter of approximately 8 cm. The central housing portion 11, base 19, pressure vessel 12, and cap 15 are all molded from a high-grade plastic to close tolerances to provide a tight fit and, thus, ensure against leakage. Additionally, an O-ring seal 20 is disposed between the interfitting threads on the central housing portion 11 and the base 19 to further ensure against leakage. The unit 10 is free-standing, i.e., it is simply supported by its base 19 on, e.g., a countertop adjacent a sink and faucet, with no external fixation required to locate or support the device. The enlarged base portion 19 provides the system 10 a low center of gravity which requires a significant force in order to tip the system. Accordingly, a stable countertop system 10 is provided.

After tap water enters the pressure vessel 12 through the adapter 16, it flows downwardly through an internal duct 21 into the central portion of the vessel 12 that supports the reverse-osmosis filter element 14. (The direction of flow of the water through the unit is indicated by the arrows in FIG. 1.) The construction of filter element 14 is well known in the art and comprises a spiral-wound thin film membrane having small micropores that allow only small pure water molecules to pass through toward a perforated central support core 22, while virtually all pollutants are too large to penetrate the filter element 14. Specifically, the filter element includes an envelope formed by a porous material in between two layers of a reverse-osmosis semipermeable membrane, with the envelope being spirally wound about the support core with a separator grid separating adjacent envelopes. In practice, the filter element includes between about 2 sq. cm and 10 sq. cm of semipermeable membrane surface area per cu. cm of volume of the filter element 14. While pure water passes radially through the filter membrane 14 at a relatively slow rate (as compared to the flow rate of normal household tap water) toward the support core 22, a large portion of the tap water introduced into the pressure vessel 12, along with the pollutants unable to pass through the filter membrane 14, flows axially downwardly through the porous material and enters a receiver 24 located at the bottom of the pressure vessel 12, the pressure from the faucet forcing the feed water downward through the filter element 14 at a sufficient flow rate to carry with it the wastes left behind. Tubing 24a is connected to a duct 24b extending from the receiver 24 of the pressure vessel 12 and passes through the central housing portion 11 to a drain (not shown) into which the impure water or brine is discharged.

After passing through the semipermeable membrane surface of the reverse-osmosis filter element 14, the product water flows through perforations 22a in the central support core 22 into the interior of the core. The core 22 may optionally contain a small quantity (less than 10 grams) of granulated activated charcoal or carbon 25 which, as the water flows upwardly therethrough, adsorbs some of the remaining odors, organic wastes, pesticides, tastes, color and chlorine.

However, the extent to which these residual contaminants are removed is primarily a function of the quantity of carbon and the residence time during which the product water is in contact with the carbon. Because the quantity of granulated carbon 25 is small and because the density of the granules is such that the product water flows through the granules relatively unhindered, the residence time is short and removal of organic wastes and other residual contaminants is not as complete as desirable. Where in the past size limitations for over-the-counter units restricted the extent of post-filtration treatment of product water, in accordance with the present invention, the product water from the reverse-osmosis filter is slowly post-filtered through a large quantity of carbon contained within the purification system 10 to remove essentially all organic waste not removed by the reverse-osmosis membrane. A suitably long service life for the carbon post-filter is attained because the initial filtration through the reverse-osmosis membrane both reduces the organic load on the carbon post-filter and eliminates particulate matter that could otherwise cause plugging of the carbon post-filter or constitute food for bacteria. As a consequence, an attractive, compact, over-the-counter water purification system is provided that produces water of the highest degree of purity while having a service life suitably long to make the use of the unit convenient.

Returning to the drawings, after the product water flows up through the granulated carbon 25 in the interior of the central core 22 of the filter element 14, it travels through a discharge duct 26 including a tubular portion 26a that extends outwardly from the cap member 15 of the pressure vessel 12 and has an enlarged end to securely hold an external supply tube 28. The product water then flows down through the supply tube 28 into the base portion 19 of the housing through a raised inlet port 19a. The base 19 houses an activated carbon block filter 29. To function effectively, the block filter 29 contains between approximately 10 and 1,000 grams of activated carbon, with the carbon particles being sized between 1 and 500 microns. In practice, a block filter 29 containing approximately 90 grams of activated carbon has been determined to be satisfactory. The filter 29 is preferably in the form of a short, cylindrical pressed block formed with a central aperture 30 and with its top and bottom surfaces encased in rigid plastic members 31 that leave substantially the entire outer side walls of the pressed block 29 exposed to the product water that is introduced to the base 19. The upper plastic member of the filter block is threadably received on an externally threaded hollow finger 33 integral with the central housing portion 11 to receive the filter block 29 in place within the base 19. Alternatively, the activated carbon may be in the form of a cylindrical unit of granular carbon within a cannister. After the product water enters the base 19 through the inlet port 19a, it flows radially outwardly into a peripheral annulus 35 defined by the inside surface of the base member 19 and the exposed portion of the filter block 29. The water then slowly seeps through the pressed block filter 29, at a rate of between approximately 5 to 100 milliliters per minute, toward the central aperture 30, from which the water flows up through the hollow finger 33 and out through an outlet 36 from the central portion 11 of the system 10 through a supply tube 32 and into, e.g., a reservoir (not shown) in which water is stored for future use. At this flow rate, a residence time of between 15 and 30 minutes is assumed, thus providing for the nearly complete adsorption of organics in the product water by the carbon in the block filter 29. In order to ensure that none of the carbon granules in the block filter 29 break off and exit the unit 10 with the purified water, prior to the assembly, the carbon block is wrapped with a woven, porous, cloth-like material 34 that retains any carbon granules should they become disassociated from the block filter 29.

Thus, it can be seen that a free-standing, point-of-use, reverse-osmosis water purification system has been provided that more completely purifies water than was previously possible with other counter-top systems. While the invention has been described in terms of a preferred embodiment, there is no intent to limit the invention to the same. On the contrary, it is intended to cover all equivalents and modifications within the scope of the appended claims.

What is claimed is:

1. A self-contained water purification device having an integral, free-standing housing, including a base for supporting the device, comprising, in combination, a pressure vessel supported in the housing and including first tubing means for receiving supply water at a pressure beteen approximately 20 and 100 psig, a reverse-osmosis filter element having a semipermeable membrane with a surface area of at least 2 sq. cm per cu. cm of volume of the reverse-osmosis filter element supported within the pressure vessel, means for discharging from the pressure vessel a portion of the supply water and impurities unable to pass through the reverse-osmosis filter element, second tubing means for receiving product water that has passed through the reverse-osmosis filter element, second tubing means exiting from the pressure vessel and terminating at an inlet to a carbon unit located within the base containing between approximately 10 and 1,000 grams of activated carbon, within which the product water has a residence time of between approximately 5 and 30 minutes, a flow passage within the base causing the product water to flow through the activated carbon, and third tubing means receiving the product water after it has flowed through the activated carbon, the third tubing means terminating in a region exterior of the housing.

2. The combination of claim 1 wherein the activated carbon is in the from of a pressed block through which the flow is radially inward and having a central aperture through which the product water flows after being treated by the activated carbon, and the particle size of the activated carbon is between approximately 1 micron and 500 microns.

3. The combination of claim 1 wherein the activated carbon is in the form of a cylindrical unit of granular carbon through which the flow is radially inward and having a central aperture through which the product water flows after being treated by the activated carbon, and the particle size of the activated carbon is between approximately 1 micron and 500 microns.

4. A self-contained water purification device having an integral, free-standing housing, including a base for supporting the device, comprising, in combination, a pressure vessel supported in the housing and including first tubing means for receiving supply water at a pressure between approximately 20 and 100 psig, a reverse-osmosis filter element having a semipermeable membrane with a surface area of at least 2 sq. cm per cu. cm of volume of the reverse-osmosis filter element supported within the pressure vessel, means for discharging from the pressure vessel a portion of the supply water and impurities unable to pass through the reverse-osmosis filter element, second tubing means for receiving product water that has passed through the reverse-osmosis filter element, second tubing means exiting from the pressure vessel and terminating at the base, the base having a larger diameter than the portion of the pressure vessel supporting the reverse-osmosis filter element and including between approximately 10 and 1,000 grams of activated carbon, within which the product water has a residence time of between approximately 5 and 30 minutes, a peripheral annulus being defined within the base by the activated carbon and the base causing the product water to flow radially inwardly through the activated carton, third tubing means receiving the product water after it has flowed through the activated carbon, the third tubing means terminating in a region exterior of the housing.

5. A continuous method of purifying tap water comprising passing tap water at a pressure of between approximately 20 and 100 psig through a reverse-osmosis filter membrane, flowing the filtered water at a rate of between approximately 5 and 100 milliliters per minute through between approximately 10 and 1,000 grams of activated carbon, maintaining the filtered water in contact with the activated carbon between approximately 15 and 30 minutes, and flowing the water out of the activated carbon for use.

6. The method of claim 5 wherein the particle size of the activated carbon is between approximately 1 micron and 500 microns.

* * * * *

UNITED STATES PATENT AND TRADEMARK OFFICE
CERTIFICATE OF CORRECTION

PATENT NO. : 4,711,723
DATED : December 8, 1987
INVENTOR(S) : Donald T. Bray

It is certified that error appears in the above-identified patent and that said Letters Patent is hereby corrected as shown below:

ABSTRACT, line 16, Change "of" to --or--,

, line 18, After "color" insert --,-- (comma).

Column 5, line 11, Correct the spelling of --between--,

, line 34, Change "from" to --form--.

Signed and Sealed this

Third Day of May, 1988

Attest:

DONALD J. QUIGG

*Attesting Officer*    Commissioner of Patents and Trademarks